United States Patent [19]

Plummer et al.

[11] Patent Number: 5,736,117
[45] Date of Patent: Apr. 7, 1998

[54] SULFUR DEBONDING AGENT ENHANCING SULFUR RECOVERY FROM A HYDROGEN SULFIDE CONVERSION PROCESS

[75] Inventors: Mark A. Plummer, Littleton; James E. Tackett, Castle Rock, both of Colo.

[73] Assignee: Marathon Oil Company, Findlay, Ohio

[21] Appl. No.: 537,204

[22] Filed: Sep. 29, 1995

[51] Int. Cl.$^6$ ............................. B01D 53/52; C01B 17/05
[52] U.S. Cl. ........................... 423/573.1; 423/567.1; 423/576.2
[58] Field of Search ..................... 423/562, 563, 423/567.1, 573.1, 576.2

[56] References Cited

U.S. PATENT DOCUMENTS

| | | | |
|---|---|---|---|
| 3,832,454 | 8/1974 | Renault et al. | 423/574 |
| 3,862,335 | 1/1975 | Renault et al. | 423/575 |
| 3,923,966 | 12/1975 | Vaughan | 423/573 |
| 3,937,795 | 2/1976 | Hasebe | 423/573 G |
| 4,002,727 | 1/1977 | Sonoda et al. | 423/573 R |
| 4,020,144 | 4/1977 | Bosniack | 423/226 |
| 4,044,114 | 8/1977 | Dezael et al. | 423/574 R |
| 4,048,293 | 9/1977 | Renault et al. | 423/574 L |
| 4,053,575 | 10/1977 | Haas et al. | 423/575 |
| 4,330,305 | 5/1982 | Kuessner et al. | 55/48 |
| 4,356,155 | 10/1982 | Blytas et al. | 423/226 |
| 4,368,178 | 1/1983 | Diaz | 423/226 |
| 4,592,905 | 6/1986 | Plummer et al. | 453/573 R |
| 4,636,377 | 1/1987 | Heisel et al. | 423/575 |
| 4,637,926 | 1/1987 | Phillips et al. | 423/573 R |
| 4,664,903 | 5/1987 | Becker et al. | 423/573 R |
| 4,666,695 | 5/1987 | Baur et al. | 423/571 |
| 5,180,572 | 1/1993 | Plummer | 423/576.7 |
| 5,334,363 | 8/1994 | Plummer | 423/226 |

FOREIGN PATENT DOCUMENTS

| | | | |
|---|---|---|---|
| 805598 | 2/1969 | Canada. | |
| 14 94 795 | 7/1969 | Germany. | |
| 1234355 | 5/1986 | U.S.S.R. | 423/567.1 |

OTHER PUBLICATIONS

Plummer, M.A., "Sulfur and hydrogen from $H_2S$", Hydrocarbon Processing, pp. 38–40, Apr. 1987.

*Primary Examiner*—Gary P. Straub
*Assistant Examiner*—Timothy C. Vanoy
*Attorney, Agent, or Firm*—Jack L. Hummel; Jack E. Ebel

[57] ABSTRACT

Recovery of an insoluble polymeric sulfur species from the reaction solution of a hydrogen sulfide conversion process is enhanced by adding a sulfur debonding agent to the hydrogen sulfide conversion reaction solution either at the outset of the process or after conversion of the hydrogen sulfide. Conversion of the hydrogen sulfide initially produces a soluble complex having the polymeric sulfur bound therein. The sulfur debonding agent breaks the soluble complex to produce a free insoluble polymeric species readily separable from the reaction solution by conventional physical means to obtain the desired sulfur product.

32 Claims, 1 Drawing Sheet

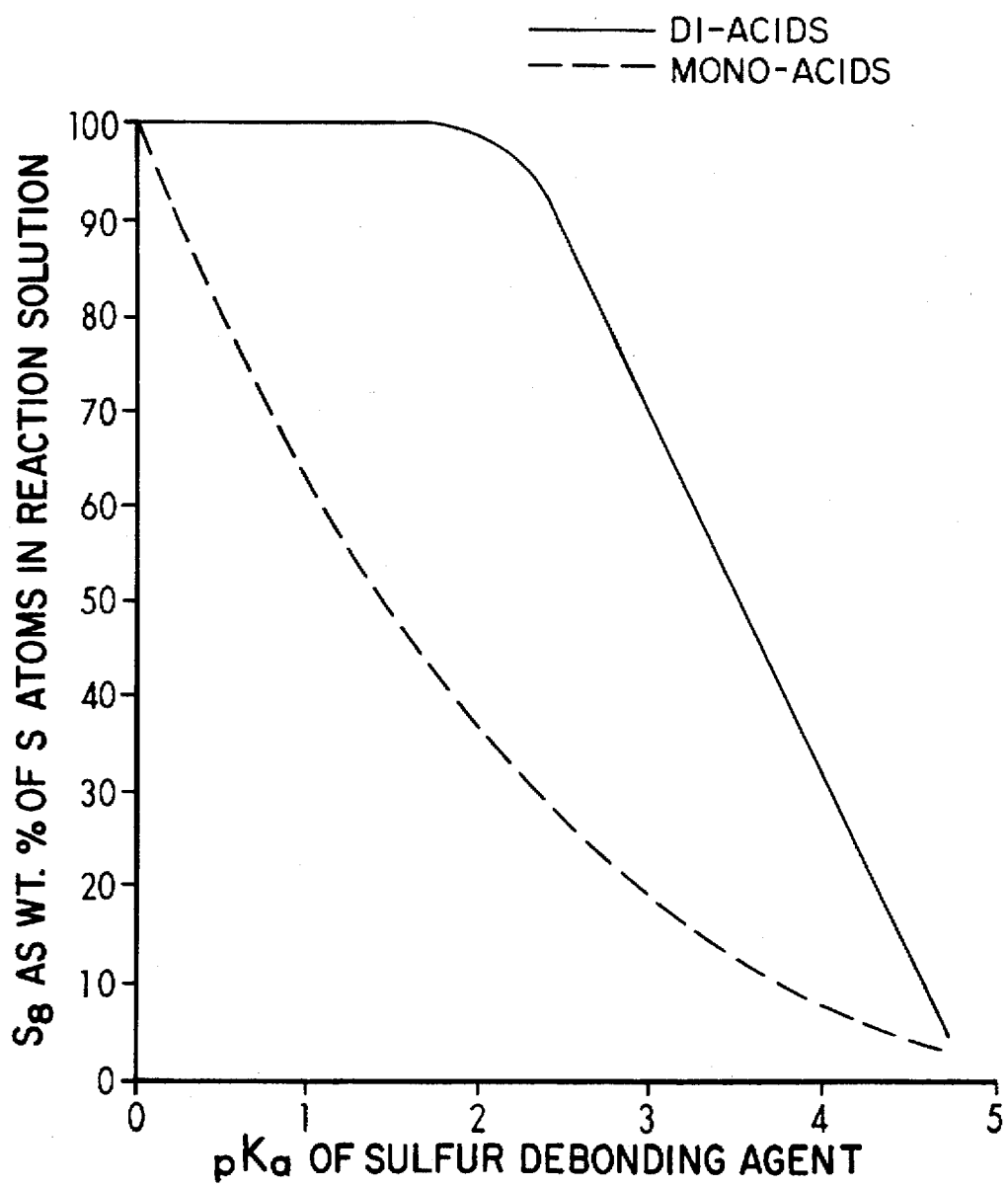

SULFUR DEBONDING AGENT ENHANCING SULFUR RECOVERY FROM A HYDROGEN SULFIDE CONVERSION PROCESS

BACKGROUND OF THE INVENTION

1. Technical Field

The present invention relates generally to a process for converting hydrogen sulfide to sulfur and hydrogen and, more particularly, to a process for enhancing the recovery of sulfur from the reaction solution of a hydrogen sulfide conversion process, wherein the hydrogen sulfide is converted to sulfur and hydrogen by contacting it with a quinone and a $H_2S$ complexing agent in solution.

2. Background Information

The conversion of hydrogen sulfide to sulfur and hydrogen by contacting the hydrogen sulfide with a selected anthraquinone in solution is generally known. For example, the following publications teach processes for recovering sulfur and hydrogen from a gas stream containing hydrogen sulfide and, as such, are incorporated herein by reference: 1) Plummer, "Sulfur and Hydrogen from $H_2S$", *Hydrocarbon Processing*, April 1987; 2) U.S. Pat. No. 4,592,905 to Plummer et al; and 3) U.S. Pat. No. 5,334,363 to Plummer. In accordance with each of the above-listed prior art processes, hydrogen sulfide contained in a gas stream, such as a hydrocarbon refinery off-gas, is dissolved in a reaction solution having an appropriate solvent and a selected anthraquinone dissolved therein. The hydrogen sulfide and anthraquinone react in solution to produce insoluble sulfur and the corresponding anthrahydroquinone of the anthraquinone. The insoluble sulfur is recovered from the reaction solution as a commercial-grade solid or liquid product. The anthrahydroquinone is dehydrogenated with a selected catalyst, regenerating the anthraquinone for recycle to the hydrogen sulfide reaction, while producing hydrogen gas as a beneficial product.

The hydrogen sulfide conversion process of U.S. Pat. No. 5,334,363 discloses the addition of a $H_2S$ complexing agent to the reaction solution to promote conversion of the anthraquinone and hydrogen sulfide to the corresponding anthrahydroquinone and sulfur. Unfortunately, increased conversion rates of the anthraquinone and hydrogen sulfide do not translated to increased sulfur recoveries because the $H_2S$ complexing agent and anthrahydroquinone undesirably retain the resulting sulfur in solution after production thereof by forming a soluble complex with the sulfur. Thus, a need exists for a means of increasing sulfur yields in the above-described hydrogen sulfide conversion process.

Accordingly, it is an object of the present invention to provide a hydrogen sulfide conversion process having increased sulfur yields. In particular, it is an object of the present invention to provide a means for enhancing the removal of sulfur from the reaction solution of a hydrogen sulfide conversion process. More particularly, it is an object of the present invention to provide a means for breaking a soluble sulfur-containing complex in the reaction solution of a hydrogen sulfide conversion process to recover insoluble sulfur therefrom. It is further an object of the present invention to provide a means for enhancing the removal of sulfur from the reaction solution of a hydrogen sulfide conversion process without substantially diminishing the hydrogen sulfide conversion rate thereof. These objects and others are achieved in accordance with the invention described hereafter.

SUMMARY OF THE INVENTION

The present invention is a process for improving sulfur yields from a hydrogen sulfide conversion process and, more particularly, a process for enhancing the recovery of a polymeric sulfur species from the reaction solution of a hydrogen sulfide conversion process. In accordance with one embodiment of the invention, the sulfur recovery process is integral with the hydrogen sulfide conversion process and comprises preparing a reaction solution containing a $H_2S$ complexing agent, a quinone, a sulfur debonding agent and a polar organic solvent. The reaction solution is contacted with a hydrogen sulfide-containing gas stream and the hydrogen sulfide is reacted with the $H_2S$ complexing agent and quinone therein to produce a polymeric sulfur species and a hydroquinone corresponding to the quinone. The polymeric sulfur species remains dissolved in the reaction solution as a soluble sulfur-containing complex with the $H_2S$ complexing agent and hydroquinone. However, the sulfur debonding agent is more strongly bonded to the $H_2S$ complexing agent than is the polymeric sulfur species. Consequently, the sulfur debonding agent reacts with the complex to break it, freeing the polymeric sulfur species, hydroquinone and $H_2S$ complexing agent from the complex. The resulting free polymeric sulfur species, which is insoluble in the reaction solution, is separated therefrom by conventional physical means to obtain the desired sulfur product. The hydroquinone retained within the reaction solution is catalytically dehydrogenated to regenerate the quinone and produce hydrogen gas. The reaction solution having the regenerated quinone dissolved therein is recycled back to the hydrogen sulfide conversion reactor.

In accordance with an alternate embodiment of the invention, the sulfur recovery process is a discrete stage of the hydrogen sulfide conversion process. The hydrogen sulfide conversion process is performed in substantially the same manner as the above-described embodiment, but the sulfur debonding agent is not initially added to the reaction solution containing the $H_2S$ complexing agent, quinone and solvent. The discrete sulfur recovery process is performed by adding the sulfur debonding agent to the reaction solution only after the reaction solution has been contacted with the hydrogen sulfide-containing gas stream to form the polymeric sulfur species as a complex with the $H_2S$ complexing agent and hydroquinone. The remainder of the hydrogen sulfide conversion process is performed in substantially the same manner as the above, breaking the complex, removing the free polymeric sulfur species, and regenerating the quinone in the reaction solution. The invention will be further understood from the accompanying drawing and description.

BRIEF DESCRIPTION OF THE DRAWING

The FIGURE is a graphical depiction of sulfur recovery as a function of the sulfur debonding agent $pK_a$.

DESCRIPTION OF PREFERRED EMBODIMENTS

The present invention is a sulfur recovery process integrally practiced in association with a hydrogen sulfide ($H_2S$) conversion process. In accordance with the $H_2S$ conversion process incorporating the sulfur recovery process therein, a selected quinone, $H_2S$ complexing agent and sulfur debonding agent are dissolved in a selected polar organic solvent to form a reaction solution. The concentration of the selected quinone in the reaction solution is between about 1 and about 80% by weight, and preferably between about 5 and about 50% by weight. The molar ratio of the $H_2S$ complexing agent to the selected quinone in the reaction solution is between about 1:50 and about 2:1, and preferably between about 1:10 and about 1:1. The molar ratio of the sulfur debonding agent to total quinone in the reaction solution is between about 1:50 and about 2:1, and preferably between about 1:10 and about 1:1. Total quinone is defined herein as the sum of the selected quinone and any hydroquinone present in the reaction solution.

Suitable polar organic solvents are compounds having a polarity greater than about 3 Debye units and include N-methyl-2-pyrrolidinone, N,N-dimethylacetamide, N,N-dimethylformamide, sulfolane (tetrahydrothiophene-1,1-dioxide), acetonitrile, 2-nitropropane, propylene carbonate and mixtures thereof. Preferred among these solvents is N-methyl-2-pyrrolidinone (NMP). Suitable selected quinones include anthraquinones, benzoquinones, naphthaquinones, and mixtures thereof. Preferred selected quinones are those having relatively high solubilities in the above-listed polar organic solvents, and include anthraquinones such as ethyl anthraquinone, t-butyl anthraquinone, t-amyl anthraquinone, s-amyl anthraquinone or mixtures thereof.

Suitable $H_2S$ complexing agents are compounds having a $pK_b$ at 25° C. of less than about 13, preferably less than about 9.5, and more preferably less than about 6.0. Compounds satisfying these criteria include amines, amides, ureas, nitrogen-containing heterocyclic aromatics, quanidines, imidazoles, and mixtures thereof. The above-recited $H_2S$ complexing agents can also be substituted with alkyl, aryl and organic alcohol groups. Specific examples of suitable $H_2S$ complexing agents are n-methylacetamide, pyridine (PY), substituted pyridines, diethylmethylamine (DEMA), tri-butylamine (TBA), tri-propylamine (TPA), methyldiethanolamine (MDEA) and tetramethylurea. Preferred among these $H_2S$ complexing agents is DEMA, TBA, PY, and substituted pyridines.

Suitable sulfur debonding agents are compounds having a $pK_a$ at 25° C. of less than about 5, preferably less than about 3, and more preferably less than about 2. Compounds satisfying these criteria are typically organic or inorganic acids containing one or more acid groups. Nonaqueous acids are preferred to aqueous acids insofar as it is desirable to control the water content of the reaction solution within defined parameters in accordance with the teaching of U.S. Pat. No. 5,334,363. Specific examples of suitable acids include trifluoroacetic acid, sulfamic acid, malonic acid, oxalic acid and mixtures thereof.

The reaction solution, containing the selected solvent, quinone, $H_2S$ complexing agent and sulfur debonding agent is fed to a $H_2S$ conversion reactor along with a feed gas stream containing $H_2S$ gas. If the feed gas stream additionally contains large quantities of other gases that are inert to the process, such as nitrogen, carbon dioxide, ammonia, methane or other low molecular weight hydrocarbon gases, the feed gas stream is initially contacted with the reaction solution in an absorber ahead of the $H_2S$ conversion reactor. In any case, the reaction solution preferentially solubilizes the $H_2S$ in the feed gas stream upon contact. The reaction solution is maintained in the $H_2S$ conversion reactor at a temperature from about 0° C. to about 70° C., a $H_2S$ partial pressure from about 0.05 to about 4.0 atmospheres, and for a time sufficient to convert the $H_2S$ and quinone reactants in the reaction solution to the polymeric sulfur and hydroquinone products. In the course of the conversion reaction, it is believed that the $H_2S$ complexing agent advantageously induces the formation of complexes that serve as intermediates in the conversion of $H_2S$ to the polymeric sulfur and hydroquinone products.

Upon conversion of the reactants, the reaction solution contains the hydroquinone and polymeric sulfur products in addition to unreacted constituents including the sulfur debonding agent, the polar organic solvent, the $H_2S$ complexing agent, any unreacted quinone, and any unreacted constituents of the feed gas stream. Although the polymeric sulfur produced by the conversion process is desirably in the form of an insoluble free polymeric sulfur species, having the formula $S_8$, that is readily separable from the reaction solution by conventional physical means, such as filtration or centrifugation, the polymeric sulfur produced by the present conversion process is more commonly in the form of a complexed polymeric species having the formula $S_x$, wherein x is between 2 and 30 inclusive. Since the polymeric sulfur species, $S_x$, is bound by either the $H_2S$ complexing agent or the hydroquinone, or both, in a soluble sulfur-containing complex, the complexed polymeric sulfur species is not readily amenable to removal from the reaction solution by conventional physical means. Consequently, the sulfur debonding agent is reacted with the soluble sulfur-containing complex in the reaction solution to free the complexed polymeric sulfur species from the complex.

The sulfur debonding reaction is conducted at a temperature between about 0° C. and about 70° C., and preferably between about 20° C. and about 60° C. The sulfur debonding reaction breaks the complex to produce a free polymeric sulfur species, having the formula $S_8$, while also freeing the $H_2S$ complexing agent and hydroquinone. Because the free polymeric sulfur species, $S_8$, is insoluble in the reaction solution, it is readily removed therefrom by conventional physical means, such as centrifugation or filtration, to obtain the final sulfur product.

The remainder of the reaction solution, which contains the polar organic solvent, hydroquinone, $H_2S$ complexing agent, sulfur debonding agent, any unreacted quinone, and any unreacted constituents of the feed gas stream, such as $H_2S$ and carbon dioxide, is removed from the $H_2S$ conversion reactor, heated to a temperature from about 70° C. to about 150° C., and preferably from about 90° C. to about 100° C., at a pressure from about 0.01 to about 2 atmospheres, and preferably from about 0.1 to about 1.0 atmosphere, and fed to a flash tank. The unreacted feed gas constituents, if any, are recovered from the reaction solution in the flash tank and recycled to the $H_2S$ conversion reactor, if desired. Either a portion or all of the sulfur debonding agent and $H_2S$ complexing agent can also be recovered from the reaction solution at this point and recycled to the $H_2S$ conversion reactor with the unreacted feed gas constituents, if desired. The remaining reaction solution containing the solvent and hydroquinone, as well as any unreacted quinone, if any, is withdrawn from the flash tank and preferably heated further to a temperature from about 150° C. to about 350° C. at a pressure at least sufficient to prevent solvent boiling. The heated reaction solution is then fed to a dehydrogenation reactor where the hydroquinone is catalytically converted to quinone and hydrogen gas under the above-stated temperature and pressure conditions in a manner known to one skilled in the art. The reaction solution containing the resulting quinone, in addition to any previously unrecovered $H_2S$ complexing agent and sulfur debonding agent, is recycled to the $H_2S$ conversion reactor and hydrogen is recovered as a product gas.

In an alternate embodiment, the present invention is a sulfur recovery process applied to the reaction solution of a $H_2S$ conversion process as a discrete stage thereof. In accordance with this embodiment, the selected quinone and $H_2S$ complexing agent are dissolved in the selected polar organic solvent and the resulting reaction solution is contacted with the $H_2S$-containing gas stream in substantially the same manner as described above, but in the absence of the sulfur debonding agent. Upon formation of the soluble complex containing the polymeric sulfur species, hydroquinone, and $H_2S$ complexing agent, the sulfur recovery stage of the $H_2S$ conversion process is initiated by adding the sulfur debonding agent to the reaction solution. As in the previous embodiment, the reaction between the complex and sulfur debonding agent breaks the complex to produce the insoluble free polymeric sulfur species, while freeing the $H_2S$ complexing agent and hydroquinone. The free polymeric sulfur species is separated from the reaction solution by conventional physical means to obtain the final sulfur product, thereby completing the sulfur recovery stage. The $H_2S$ conversion process proceeds as above by catalytically dehydrogenating the hydroquinone species to regenerate the quinone for recycle to the $H_2S$ conversion reactor.

Although the present invention is not restricted to a particular mechanism, it is believed that the complex formed by the $H_2S$ conversion process has the general formula:

($H_2S$ complexing agent)—$S_x$—(hydroquinone);

where x=2 to 30

The sulfur debonding agent is more favorably bonded to the $H_2S$ complexing agent than is the polymeric sulfur species, $S_x$, thus breaking the complex by displacing the $H_2S$ complexing agent and hydroquinone therefrom to obtain the insoluble free polymeric species, $S_8$. The ability of the sulfur debonding agent to displace the $H_2S$ complexing agent and hydroquinone from the complex is a function of the acid strength of the sulfur debonding agent expressed in terms of $kP_a$ at 25° C. The ability of the sulfur debonding agent to break the complex is also believed to be a function of steric factors, insofar as the sulfur debonding agent preferably has a spatial configuration favoring binding with the $H_2S$ complexing agent.

The present invention has been described above, wherein the $H_2S$ complexing agent and sulfur debonding agent are separate and distinct compounds. It is within the scope of the present invention, however, to provide a single amphoteric compound that functions both as a $H_2S$ complexing agent and a sulfur debonding agent. A suitable amphoteric $H_2S$ complexing and sulfur debonding agent has a base group with a $pK_b$ at 25° C. of less than about 13, preferably less than about 9.5, and more preferably less than about 6.0. The suitable amphoteric $H_2S$ complexing and sulfur debonding agent also has an acid group with a $pK_a$ at 25° C. of less than about 5, preferably less than about 3, and more preferably less than about 2. An exemplary amphoteric $H_2S$ complexing and sulfur debonding agent is aminobenzoic acid, having a base group with a $pK_b$ of 9.2 at 25° C. and an acid group with a $pK_a$ of 2.4 at 25° C. Another exemplary amphoteric $H_2S$ complexing and sulfur debonding agent is I-nicotinic acid, having a base group with a $pK_b$ of 9.1 at 25° C. and an acid group with a $pK_a$ of 1.8 at 25° C.

The following examples demonstrate the practice and utility of the present invention, but are not to be construed as limiting the scope thereof.

EXAMPLE 1

A reaction solution is prepared containing an N-methyl-2-pyrrolidinone (NMP) solvent, t-buytlanthraquinone (TBAQ) and diethylmethylamine (DEMA) as a $H_2S$ complexing agent. The reaction solution is contacted at 60° C. and 1.5 atmospheres with a $H_2S$ gas stream in a $H_2S$ conversion reactor, thereby converting the reaction solution to the following composition, wherein t-butylantrahydroquinone is designated as HTBAQH and TBAQ+HTBAQH is designated as TAQ:

|  | wt % |
|---|---|
| TAQ | 23.61 |
| NMP | 70.83 |
| Water (1.0 moles water/mole of TAQ) | 1.52 |
| DEMA (0.275 moles DEMA/mole TAQ) | 2.03 |
| Dissolved Polymeric Sulfur | 2.01 |
| Total | 100.00 |

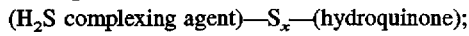
HTBAQH comprises 75.7 mole % of TAQ in the solution.

A trifluoroacetic acid sulfur debonding agent is then added to the reaction solution at 22° C. in a concentration of 1.0 moles per mole of HTBAQH. The trifluoroacetic acid has a $pK_a$ of 0.23 at 25° C. The trifluoroacetic acid is well mixed in the reaction solution and the reaction solution is stored thereafter for 30 min at the above-recited temperature. The reaction solution is filtered to remove the precipitated $S_8$. The amount of precipitated $S_8$ is determined to be 90.6 wt % of the dissolved polymeric sulfur in the reaction solution prior to addition of the sulfur debonding agent.

EXAMPLE 2

The procedure of Example 1 is repeated except that the sulfur debonding agent is sulfamic acid. The sulfamic acid has a $pK_a$ of 0.99 at 25° C. The amount of precipitated $S_8$ is determined to be 64.0 wt % of the dissolved polymeric sulfur in the reaction solution prior to addition of the sulfur debonding agent.

EXAMPLE 3

The procedure of Example 1 is repeated except that the sulfur debonding agent is acetic acid. The acetic acid has a $pK_a$ of 4.76 at 25° C. Minor amounts of $S_8$ are recovered from the reaction solution.

EXAMPLE 4

The procedure of Example 1 is repeated except that the sulfur debonding agent is hydrochloric acid. The hydrochloric acid, which is at 37 wt % and has a $pK_a$ of 0.00 at 25° C., is dissolved in water. The amount of precipitated $S_8$ is determined to be 100.0 wt % of the dissolved polymeric sulfur in the reaction solution prior to addition of the sulfur debonding agent.

The sulfur debonding agents of Examples 1–4 are all mono-acids, and all perform satisfactorily with the exception of acetic acid. It is noted, however, that aqueous hydrochloric acid is less preferred than trifluoroacetic acid or sulfamic acid for commercial applications because of the high water content of the aqueous hydrochloric acid.

EXAMPLE 5

A reaction solution is prepared containing an NMP solvent, TBAQ, DEMA, and tri-propylamine (TPA) as an additional $H_2S$ complexing agent. The reaction solution is contacted with a $H_2S$ gas stream in a $H_2S$ conversion reactor in the manner of Example 1, thereby converting the reaction solution to the following composition:

|  | wt % |
|---|---|
| TAQ | 23.04 |
| NMP | 70.60 |
| Water (1.23 moles water/mole of TAQ) | 1.92 |
| TPA (0.126 moles TPA/mole TAQ) | 2.02 |

| | wt % |
|---|---|
| DEMA (0.04 moles DEMA/mole TAQ) | 0.30 |
| Dissolved Polymeric Sulfur | 2.12 |
| Total | 100.00 |

HTBAQH comprises 74.5 mole % of TAQ in the solution.

An oxalic acid sulfur debonding agent is added to the reaction solution at 22° C. in a concentration of 1.0 moles per mole of HTBAQH. The oxalic acid has a $pK_a$ of 1.27 at 25° C. The oxalic acid is well mixed in the reaction solution and the reaction solution is stored thereafter for 30 min at the above-recited temperature. The reaction solution is then filtered to remove the precipitated $S_8$. The amount of precipitated $S_8$ is determined to be 100.0 wt % of the dissolved polymeric sulfur in the reaction solution prior to addition of the sulfur debonding agent.

EXAMPLE 6

The procedure of Example 5 is repeated except that the sulfur debonding agent is malonic acid. The malonic acid has a $pK_a$ of 2.85 at 25° C. The amount of precipitated $S_8$ is determined to be 74.9 wt % of the dissolved polymeric sulfur in the reaction solution prior to addition of the sulfur debonding agent.

The sulfur debonding agents of Examples 5 and 6 are di-carboxylic acids, and both perform satisfactorily.

EXAMPLE 7

A reaction solution is prepared containing an NMP solvent, TBAQ and pyridine (PY) as a $H_2S$ complexing agent. The reaction solution is contacted with a $H_2S$ gas stream in a $H_2S$ conversion reactor in the manner of Example 1, thereby converting the reaction solution to the following composition:

| | wt % |
|---|---|
| TAQ | 22.73 |
| NMP | 68.16 |
| Water (1.23 moles water/mole of TAQ) | 1.90 |
| PY (1.00 moles PY/mole TAQ) | 6.80 |
| Dissolved Polymeric Sulfur | 0.39 |
| Total | 100.00 |

HTBAQH comprises 57.5 mole % of TAQ in the solution.

A malonic acid sulfur debonding agent is added to the reaction solution at 22° C. in a concentration of 0.97 moles per mole of HTBAQH. The oxalic acid has a $pK_a$ of 2.85 at 25° C. The malonic acid is well mixed in the reaction solution and the reaction solution is stored thereafter for 30 min at the above-recited temperature. The reaction solution is then filtered to remove the precipitated $S_8$. The amount of precipitated $S_8$ is determined to be 77.6 wt % of the dissolved polymeric sulfur in the reaction solution prior to addition of the sulfur debonding agent.

EXAMPLE 8

The procedure of Example 7 is repeated except that the sulfur debonding agent is oxalic acid in a concentration of 0.56 moles per mole of HTBAQH. The oxalic acid has a $pK_a$ of 1.27 at 25° C. The amount of precipitated $S_8$ is determined to be 100.0 wt % of the dissolved polymeric sulfur in the reaction solution prior to addition of the sulfur debonding agent.

The results of Examples 1–8 are displayed in the FIGURE, wherein it is demonstrated that the effectiveness of the sulfur debonding agent is correlated to its $pK_a$ with sulfur debonding agent effectiveness increasing with decreasing $pK_a$ or increasing acidity of the sulfur debonding agent. It is further demonstrated that sulfur debonding agents containing two acid functions are more effective than sulfur debonding agents containing only one acid function.

EXAMPLE 9

A reaction solution is prepared containing an NMP solvent, TBAQ and DEMA as a $H_2S$ complexing agent. The reaction solution has the following composition:

| | wt % |
|---|---|
| TBAQ | 24.30 |
| NMB | 72.89 |
| Water (1.0 moles water/mole of TBAQ) | 1.65 |
| DEMA (0.144 moles DEMA/mole TBAQ) | 1.16 |
| Total | 100.00 |

The reaction solution is contacted with one mole of $H_2S$ per mole of TBAQ at 20° C. and 0.8 atmospheres in a $H_2S$ conversion reactor. After 24 hours the reaction solution is filtered to remove the precipitated $S_8$. The conversion of TBAQ to HTBAQH is determined to be 91.6 mole % and the recovery of $S_8$ is determined to be 16.6 wt % of the total polymeric sulfur produced in the $H_2S$ conversion reactor.

EXAMPLE 10

The procedure of Example 9 is repeated except that a trifluoroacetic acid sulfur debonding agent is added to the reaction solution at a concentration of 0.11 moles per mole of TBAQ before the reaction solution is contacted with the $H_2S$. The conversion of TBAQ to HTBAQH is determined to be 89.9 mole % and the recovery of $S_8$ is determined to be 73.1 wt % of the total polymeric sulfur produced in the $H_2S$ conversion reactor. A comparison of Examples 9 and 10 shows that the use of a sulfur debonding agent in accordance with the present invention increases the recovery of $S_8$.

EXAMPLE 11

A reaction solution is prepared containing an NMP solvent, TBAQ and PY as a $H_2S$ complexing agent. The reaction solution has the following composition:

| | wt % |
|---|---|
| TBAQ | 23.26 |
| NMP | 69.78 |
| PY (1.00 moles PY/mole TBAQ) | 6.96 |
| Total | 100.00 |

The reaction solution is contacted with one mole of $H_2S$ per mole of TBAQ at 20° C. and 0.8 atmospheres in a $H_2S$ conversion reactor. After 24 hours the reaction solution is filtered to remove the precipitated $S_8$. The conversion of TBAQ to HTBAQH is determined to be 90.0 mole % and the recovery of $S_8$ is determined to be 79.1 wt % of the total polymeric sulfur produced in the $H_2S$ conversion reactor.

EXAMPLE 12

The procedure of Example 11 is repeated except that a malonic acid sulfur debonding agent is added to the reaction solution at a concentration of 0.55 moles per mole of TBAQ before the reaction solution is contacted with the $H_2S$. The conversion of TBAQ to HTBAQH is determined to be 79.5 mole % and the recovery of $S_8$ is determined to be 91.8 wt % of the total polymeric sulfur produced in the $H_2S$ conversion reactor. A comparison of Examples 11 and 12 shows that the use of a sulfur debonding agent in accordance with the present invention increases the recovery of $S_8$.

Examples 1–8 demonstrate an above-described embodiment of the present invention, wherein the sulfur debonding agent is added to the reaction solution after conversion of the TBAQ and $H_2S$. Examples 10 and 12 demonstrate another above-described embodiment of the present invention, wherein the sulfur debonding agent is incorporated into the initial reaction solution containing the TBAQ and $H_2S$ complexing agent prior to conversion of the TBAQ and $H_2S$.

Comparison of Examples 1–6 with Examples 7–8 demonstrates that sulfur debonding agents are effective in the presence of both high basicity $H_2S$ complexing agents (DEMA and TPA) and low basicity $H_2S$ complexing agents (PY). Comparison of Examples 9–10 with Examples 11–12 demonstrates the same result.

While the foregoing preferred embodiments of the invention have been described and shown, it is understood that alternatives and modifications, such as those suggested and others, may be made thereto and fall within the scope of the present invention.

We claim:

1. A process for converting hydrogen sulfide gas to a polymeric sulfur species comprising:
    providing a reaction solution containing a $H_2S$ complexing agent and a quinone;
    contacting said reaction solution with hydrogen sulfide gas;
    reacting said hydrogen sulfide gas with said $H_2S$ complexing agent and said quinone to produce a soluble sulfur-containing constituent dissolved in said reaction solution;
    adding a sulfur debonding agent to said reaction solution, said sulfur debonding agent having a $pK_a$ below about 5 at about 25° C.;
    reacting said sulfur debonding agent with said soluble sulfur-containing constituent to produce a free polymeric sulfur species insoluble in said reaction solution; and
    separating said free polymeric sulfur species from said reaction solution.

2. The process of claim 1 further comprising converting said quinone to a corresponding hydroquinone.

3. The process of claim 2 wherein said sulfur debonding agent and total quinone consisting of said quinone and said hydroquinone are contained in said reaction solution in a molar ratio between about 1:50 and about 2:1.

4. The process of claim 1 wherein said sulfur debonding agent has a $pK_a$ below about 3 at about 25° C.

5. The process of claim 1 wherein said sulfur debonding agent has a $pK_a$ below about 2 at about 25° C.

6. The process of claim 1 wherein said sulfur debonding agent is a mono-acid or a poly-acid.

7. The process of claim 1 wherein said sulfur debonding agent is reacted with said soluble sulfur-containing constituent at a temperature between about 0° C. and about 70° C.

8. The process of claim 1 wherein said $H_2S$ complexing agent and said quinone are contained in said reaction solution in a molar ratio between about 1:50 and about 2:1.

9. The process of claim 1 wherein said $H_2S$ complexing agent is selected from the group consisting of amines, amides, ureas, nitrogen-containing heterocyclic aromatics, quanidines, imidazoles, and mixtures thereof, and amines, amides, ureas, nitrogen-containing heterocyclic aromatics, quanidines, imidazoles, and mixtures thereof, substituted with alkyl, aryl or organic alcohol groups.

10. The process of claim 1 wherein said $H_2S$ complexing agent has a $pK_b$ less than about 13 at about 25° C.

11. The process of claim 1 wherein said $H_2S$ complexing agent has a $pK_b$ less than about 9.5 at about 25° C.

12. The process of claim 1 wherein said $H_2S$ complexing agent has a $pK_b$ less than about 6.0 at about 25° C.

13. A process for converting hydrogen sulfide gas to a polymeric sulfur species comprising:
    providing a reaction solution containing a $H_2S$ complexing agent, a quinone and a sulfur debonding agent, said sulfur debonding agent having a $pK_a$ below about 5 at about 25° C.;
    contacting said reaction solution with hydrogen sulfide gas;
    reacting said hydrogen sulfide gas with said $H_2S$ complexing agent and said quinone to produce a soluble sulfur-containing constituent dissolved in said reaction solution;
    reacting said sulfur debonding agent with said soluble sulfur-containing constituent to produce a free polymeric sulfur species insoluble in said reaction solution; and
    separating said free polymeric sulfur species from said reaction solution.

14. The process of claim 13 further comprising converting said quinone to a corresponding hydroquinone.

15. The process of claim 14 wherein said sulfur debonding agent and total quinone consisting of said quinone and said hydroquinone are contained in said reaction solution in a molar ratio between about 1:50 and about 2:1.

16. The process of claim 13 wherein said sulfur debonding agent has a $pK_a$ below about 3 at about 25° C.

17. The process of claim 13 wherein said sulfur debonding agent has a $pK_a$ below about 2 at about 25° C.

18. The process of claim 13 wherein said sulfur debonding agent is a mono-acid or a poly-acid.

19. The process of claim 13 wherein said sulfur debonding agent is reacted with said soluble sulfur-containing constituent at a temperature between about 0° C. and about 70° C.

20. The process of claim 13 wherein said $H_2S$ complexing agent and said quinone are contained in said reaction solution in a molar ratio between about 1:50 and about 2:1.

21. The process of claim 13 wherein said $H_2S$ complexing agent is selected from the group consisting of amines, amides, ureas, nitrogen-containing heterocyclic aromatics, quanidines, imidazoles, and mixtures thereof, and amines, amides, ureas, nitrogen-containing heterocyclic aromatics, quanidines, imidazoles, and mixtures thereof, substituted with alkyl, aryl or organic alcohol groups.

22. The process of claim 13 wherein said $H_2S$ complexing agent has a $pK_b$ less than about 13 at about 25° C.

23. The process of claim 13 wherein said $H_2S$ complexing agent has a $pK_b$ less than about 9.5 at about 25° C.

24. The process of claim 13 wherein said $H_2S$ complexing agent has a $pK_b$ less than about 6.0 at about 25° C.

25. A process for converting hydrogen sulfide gas to a polymeric sulfur species comprising:
    providing a reaction solution containing a quinone and an amphoteric $H_2S$ complexing and sulfur debonding agent, said amphoteric $H_2S$ complexing and sulfur debonding agent having a p$K_a$ below about 5 and a p$K_b$ less than about 13 at 25° C.;

contacting said reaction solution with hydrogen sulfide gas;

reacting said hydrogen sulfide gas with said amphoteric $H_2S$ complexing and sulfur debonding agent to produce a free polymeric sulfur species insoluble in said reaction solution; and separating said free polymeric sulfur species from said reaction solution.

26. The process of claim 25 furthering comprising converting said quinone to a corresponding hydroquinone.

27. The process of claim 26 wherein said amphotedc $H_2S$ complexing and sulfur debonding agent and total quinone consisting of said quinone and said hydroquinone are contained in said reaction solution in a molar ratio between about 1:50 and about 2:1.

28. The process of claim 25 wherein said amphotedc $H_2S$ complexing and sulfur debonding agent is reacted with said hydrogen sulfide gas at a temperature between about 0° C. and about 70° C.

29. The process of claim 25 wherein said $H_2S$ complexing and sulfur debonding agent and said quinone are contained in said reaction solution in a molar ratio between about 1:50 and about 2:1.

30. A process for converting hydrogen sulfide gas to a polymeric sulfur species comprising:

providing a reaction solution containing a $H_2S$ complexing agent and a quinone;

contacting said reaction solution with hydrogen sulfide gas;

reacting said hydrogen sulfide gas with said $H_2S$ complexing agent and said quinone to produce a soluble sulfur-containing constituent dissolved in said reaction solution;

adding a sulphur debonding agent to said reaction solution, said sulphur debonding agent being selected from the group consisting of trifuoroacetic acid, sulfamic acid, malonic acid, oxalic acid and mixtures thereof;

reacting said sulfur debonding agent with said soluable sulphur-containing constituent to produce a free polymeric sulphur species insoluble in said reaction solution; and separating said free polymeric sulphur species from said reaction solution.

31. A process for converting hydrogen sulfide gas to a polymeric sulfur species comprising:

providing a reaction solution containing a $H_2S$ complexing agent, a quinone and a sulfur debonding agent, said sulfur debonding agent being selected from the group consisting of trifluoroacetic acid, sulfamic acid, malonic acid, oxalic acid and mixtures thereof;

contacting said reaction solution with hydrogen sulfide gas;

reacting said hydrogen sulfide gas with said $H_2S$ complexing agent and said quinone to produce a soluble sulfur-containing constituent dissolved in said reaction solution;

reacting said sulfur debonding agent with said soluble sulfur-containing constituent to produce a free polymeric sulfur species insoluble in said reaction solution; and separating said free polymeric sulfur species from said reaction solution.

32. A process for converting hydrogen sulfide gas to a polymeric sulfur species comprising:

providing a reaction solution containing a quinone and an amphoteric $H_2S$ complexing and sulfur debonding agent, said amphoteric $H_2S$ complexing and sulfur debonding agent being selected from the group consisting of aminobenzoic acid, I-nicotinic acid and mixtures thereof;

contacting said reaction solution with hydrogen sulfide gas;

reacting said hydrogen sulfide gas with said amphoteric $H_2S$ complexing and sulfur debonding agent to produce a free polymeric sulfur species insoluble in said reaction solution; and separating said free polymeric sulfur species from said reaction solution.

* * * * *

UNITED STATES PATENT AND TRADEMARK OFFICE
CERTIFICATE OF CORRECTION

PATENT NO. : 5,736,117
DATED : April 7, 1998
INVENTOR(S) : Mark A. Plummer, et al.

It is certified that error appears in the above-indentified patent and that said Letters Patent is hereby corrected as shown below:

Col. 11, line 13 : Delete "amphotedc" and insert --amphoteric--.
Col. 11, line 18 : Delete "amphotedc" and insert --amphoteric--.
Col. 11, line 41 : Delete "soluable" and insert --soluble.
Col. 11, line 42 : Delete "sulphur" and insert --sulfur--.
Col. 12, line 1 : Delete "sulphur" and insert --sulfur--.

Signed and Sealed this

Sixth Day of April, 1999

Attest:

Q. TODD DICKINSON

Attesting Officer

Acting Commissioner of Patents and Trademarks